United States Patent [19]

Lagunas-Solar et al.

[11] Patent Number: 5,364,645
[45] Date of Patent: Nov. 15, 1994

[54] METHOD OF CONTROLLING MICROORGANISMS BY PULSED ULTRAVIOLET LASER RADIATION

[75] Inventors: Manuel C. Lagunas-Solar, Davis, Calif.; Alvan W. Pyne, Kennelon, N.J.

[73] Assignee: The Regents of the University of California, Oakland, Calif.

[21] Appl. No.: 969,487

[22] Filed: Oct. 30, 1992

[51] Int. Cl.$^5$ ............................................... A23L 3/00
[52] U.S. Cl. .................................... 426/248; 426/521
[58] Field of Search ............ 426/248, 238, 521; 422/24

[56] References Cited

U.S. PATENT DOCUMENTS

| | | | |
|---|---|---|---|
| 3,817,703 | 6/1974 | Atwood | 426/248 |
| 3,926,556 | 12/1975 | Boucher | 426/248 |
| 3,941,670 | 3/1976 | Pratt, Jr. | 204/158 R |
| 3,955,921 | 5/1976 | Tensmeyer | 219/121 LM |
| 4,042,325 | 8/1977 | Tensmeyer | 219/121 LM |
| 4,201,916 | 5/1980 | Ellner | 250/372 |
| 4,529,489 | 7/1985 | McDonald | 204/158 R |
| 4,661,264 | 4/1987 | Goudy | 422/24 |
| 4,871,559 | 10/1989 | Dunn et al. | 426/248 |
| 4,880,512 | 11/1989 | Cornelius et al. | 204/157.61 |
| 5,034,235 | 7/1991 | Dunn et al. | 426/238 |
| 5,059,431 | 10/1991 | Daeschel et al. | 426/13 |
| 5,089,384 | 2/1992 | Hale | 435/2 |
| 5,120,450 | 6/1992 | Stanley, Jr. | 210/748 |
| 5,144,146 | 9/1992 | Wekhof | 210/748 |
| 5,235,043 | 8/1993 | Collins et al. | 530/399 |

Primary Examiner—George Yeung
Attorney, Agent, or Firm—John P. O'Banion

[57] ABSTRACT

Microorganisms, including not only bacteria related to hygiene, food spoilage and human pathogenesis but also fungi which are commonly found in fresh fruits and vegetables, can be reduced or eliminated for surface microbial disinfection of foods and for other purposes by exposing an area containing such microorganisms to a monochromatic beam of pulsed ultraviolet laser radiation of wavelength about 240–280 nm, or in particular about 240–260 nm, with pulse duration in the range of picoseconds to microseconds at 1–1900 mJ/cm$^2$ for most situations. Laser energy irradiance should be controlled in the case of some foods because of the limited tolerance to such exposure.

20 Claims, 3 Drawing Sheets

METHOD OF CONTROLLING MICROORGANISMS BY PULSED ULTRAVIOLET LASER RADIATION

BACKGROUND OF THE INVENTION

This invention relates to a method of controlling to reduce or eliminate microorganisms by exposing them to ultraviolet (UV) radiation and, more particularly, to a method of surface microbial disinfection of foods and other objects subject to microbial contamination by using ultraviolet (UV) radiation with short high-intensity pulses.

Because of the current trends in consumer demands and regulatory actions, there is an urgent need to develop non-additive alternative processes capable of replacing or minimizing the food industry's current reliance on many chemical preservatives used as antimicrobial agents. A majority of these agents exert their controlling action on the microbial flora present on the surface of foods. Under exposure to non-ionizing radiation energy, microbial control has been shown to be caused by structural alterations in nucleic acids such as desoxyribonucleic acid (DNA) and ribonucleic acid (RNA), as well as in other chemical structures such as proteins and enzymes having similar resonance frequencies and high absorptivity for UV radiation. These alterations prevent DNA replication and transcription and hence the growth of the microbial population. No information, however, has been available yet about the effectiveness of this process on contaminated food surfaces, nor has it been known whether unwanted changes of the sensory properties of foods may also occur.

A majority of the research, reported thus far, on effects on DNA induced by non-ionizing radiation has been based on the use of Hg lamps emitting 260 nm (4.77 eV) ultraviolet radiation. The inactivation of DNA under this condition, therefore, is well known. Low-intensity (0.10–10W/m$^2$) continuous-wave polychromatic (broad band) ultraviolet irradiation (4.88 eV) of DNA and RNA, nucleic acid components including purine and pyrimidine bases, as well as the bases themselves, leads to one-quantum excitation of low-lying electronic energy levels of the targeted molecule. This one-step process is due to the absorption of one photon. Under these conditions, radiation damage to DNA results from dimerization and/or hydration of adjacent pyrimidine bases. Furthermore, the dimer may not be repaired by photoreactivation or dark reactivation. It blocks the enzymatic action of DNA-polymerase and hence inhibits DNA replication. Although effective, this low-intensity process is extremely slow and limited for large-scale microbial controls from logistical and economical points of view.

Lasers generating monochromatic ultraviolet radiation with short pulses in the range of picoseconds to nanoseconds, and hence with considerably more radiation power than continuous-wave polychromatic ultraviolet lamps, have also been studied as sources for DNA effects. With the development of high-intensity ultraviolet laser radiation sources, it was shown that an effective destruction of nucleic acids resulted in vitro when aqueous solutions containing nucleic acid components were exposed thereto. It has also been found recently that high-power ultraviolet laser radiation causes two-photon photolysis of water and that the products of water photolysis, as well as products of water radiolysis from ionizing radiation sources, could also react effectively with nucleic acid components. The efficiency of indirect photolysis, however, was also found to be 2–4 times lower than that of radiolysis, suggesting the possibility of exploring lower wavelength ultraviolet laser radiation to approach water radiolysis yields. The latter approach was demonstrated when induction of single-strand scissions in Simian Virus 40 DNA were detected when exposing it to pulsed (20 nsec) ultraviolet laser radiation of 193 nm (6.42 eV). These results were comparable to the single-strand and double-strand scissions typical of ionizing radiation.

Extensive research has also been conducted with sources of ionizing radiation. Most of these investigations, however, were based on the use of 1.2-MeV Co-60 and 0.662-MeV Cs-137 photons from radioisotopic sources, bremsstrahlung radiation or electron beams from an accelerator. Currently, world-wide acceptance of the technology of food irradiation is growing. Since viruses, mycoplasmas, bacteria and fungi can be destroyed by ultraviolet radiation, whether they are suspended in air or in liquids or deposited on surfaces, ultraviolet radiation has been used in a variety of applications such as (1) destruction of air-borne microorganisms for improving air-hygiene, (2) inactivation of microorganisms located on surfaces or suspended in liquids, and (3) protection or disinfection of many products of unstable composition that cannot tolerate other conventional treatments such as by heat, gas or chemicals.

SUMMARY OF THE INVENTION

It is a general object of the present invention to provide an improved method of controlling microorganisms without using heat, gas or chemicals.

It is a particular object of the present invention to provide a method of controlling microorganisms to reduce or eliminate them by exposing them to ultraviolet (UV) radiation with short high-intensity pulses.

It is another object of the present invention to provide an improved method of preserving foods and other objects subject to microbial contamination.

It is still another object of the present invention to provide such a method having a non-repairable effect on nucleic acids and capable of reducing or eliminating cell division of microorganisms on the surface of foods or elsewhere.

It is still another object of the present invention to provide a method by which microbial control can be effected extremely quickly.

A method embodying the present invention, with which the above and other objects can be achieved, may be characterized as comprising the steps of producing a monochromatic beam of pulsed ultraviolet laser radiation of wavelength about 240–280 nm and pulse duration of $10^{-12}$–$10^{-6}$ seconds, and exposing an area containing microorganisms to this pulsed laser radiation. More specifically, objects subject to microbial decay such as foods are exposed to a monochromatic beam of pulsed ultraviolet laser radiation of wavelength about 248 nm within a range of maximum ultraviolet light absorption by nucleic acids, having pulse duration in the range of picoseconds to microsecond (or $10^{-12}$–$10^{-6}$ seconds) and energy of 1–500 mJ/pulse or even higher, as more powerful lasers may become available.

BRIEF DESCRIPTION OF THE DRAWINGS

The accompanying drawings, which are incorporated in and form a part of this specification, are intended, together with the description, to serve to explain the principles of the invention. In the drawings.

DETAILED DESCRIPTION OF THE INVENTION

The present invention is in part based on the following discoveries made by the present inventors. Firstly, it was discovered that an effective and somewhat selective process of energy transfer can be accomplished by electronic excitation of the DNA/RNA molecular structures with 248-nm photons from a well-defined narrow band of a chemical laser system operating at 200–400 mJ/pulse and pulse duration of 20–30 nsec. This energy transfer process destroys existing surface microorganisms, including bacteria, yeasts and viruses. Secondly, pulsed UV lasers can cause non-repairable damage to DNA and RNA. Because of the high instantaneous power, the concentration of excited molecules is considerably higher than those obtained with lower power UV sources. This power and the resulting concentration affect the kinetics of the resulting system and favor radical-radical reactions, resulting in an irreversible (non-repairable) disruption of DNA/RNA that is too fast to allow repair by photoreactivation or by other repair systems. The net result is the prevention of the cell division process which normally takes place on contaminated food surfaces or the like. Thirdly, it was found that the amount of UV radiant energy needed to achieve microbial control is considerably lower than the energy threshold for other injurious effects on the surface of the foods.

Bases for the method according to the present invention will be discussed below from the following three points of view: (I) Photochemical effects, (II) Microbiological effects, and (III) Sensory effects.

(I) Photochemical Effects

In order to evaluate photolytic effects of pulsed UV laser photons on various DNA components which are responsible for genetic information, photochemical yields (or fractional decomposition as a function of radiant energy) were measured for different purine and pyrimidine bases as well as for a series of nucleosides and nucleotides (or phosphorylated nucleosides) representing the building blocks of DNA. For the purpose of comparison, uracil (a pyrimidine base in RNA) and its derivatives were also measured. Table 1 shows the different nucleic acid components which have been studied.

Figure 1A:
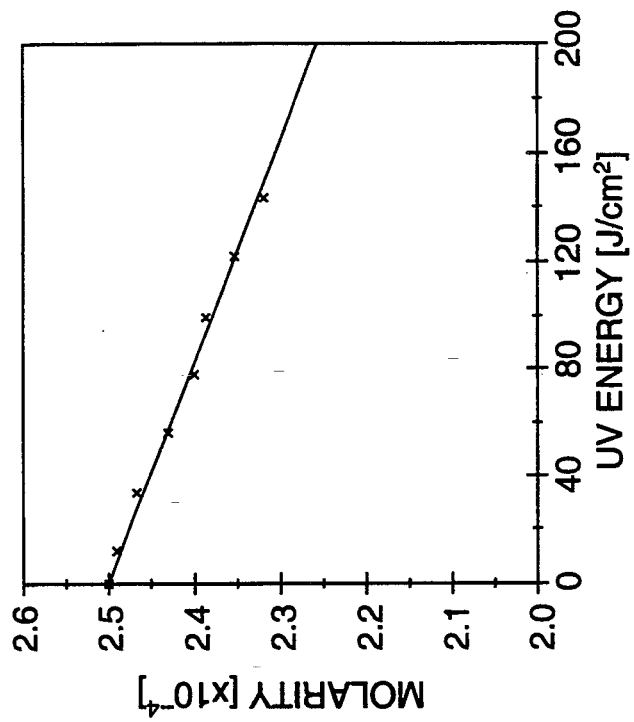
FIGS. 1(a), 1(b), 1(c) and 1(d) are graphs for showing experimentally obtained photochemical effects of radiant energy from pulsed UV laser on aqueous solution of adenosine monophosphate (AMP)
Figure 1B:
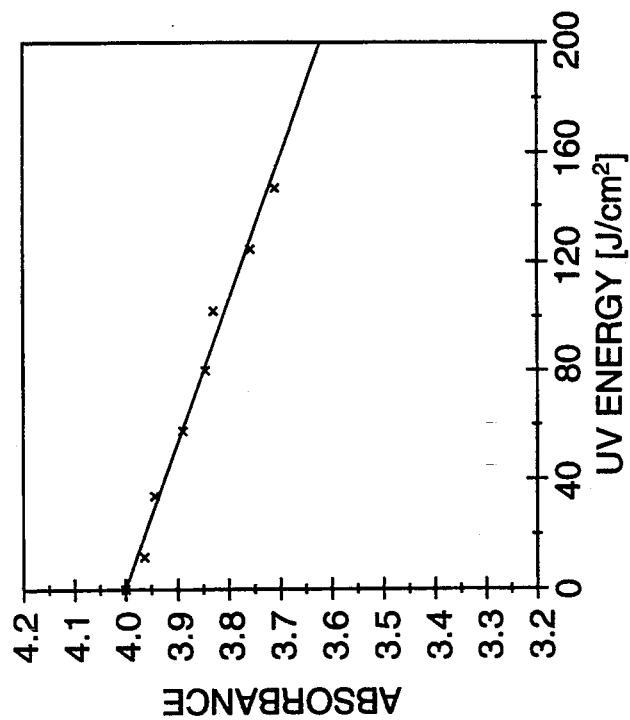
Figure 1D:
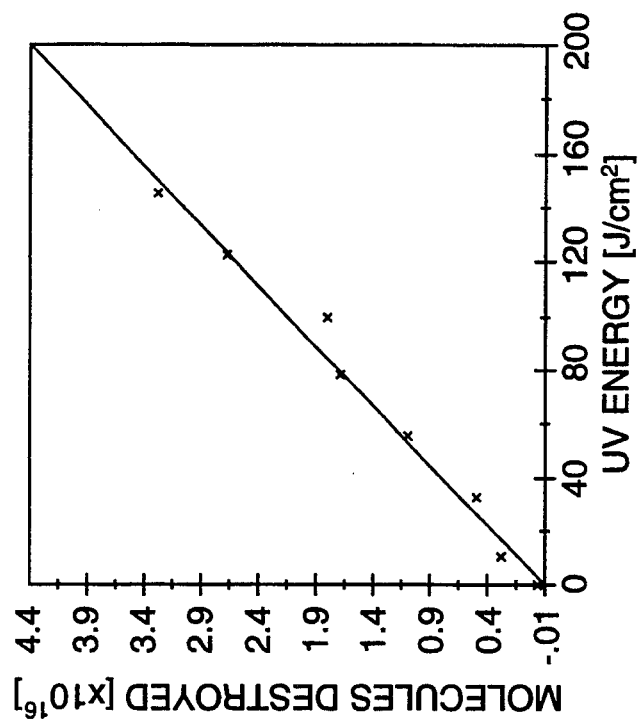
Figure 1C:
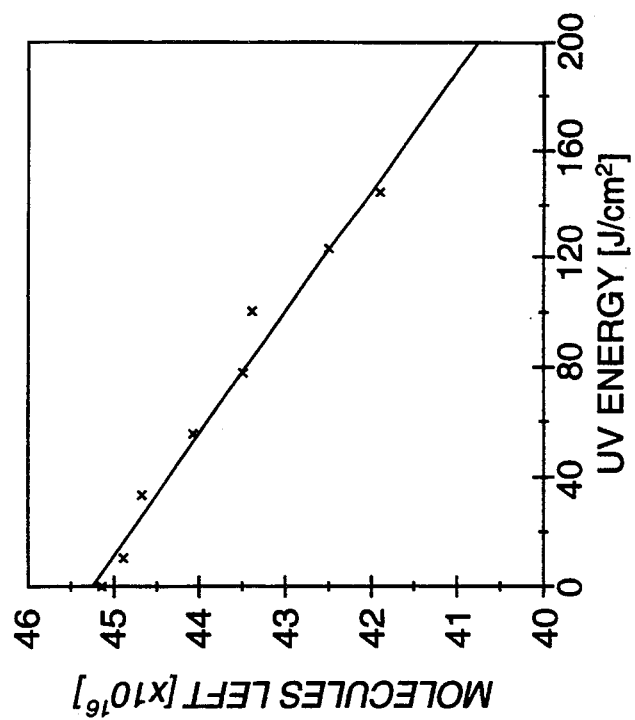
Figure 2:
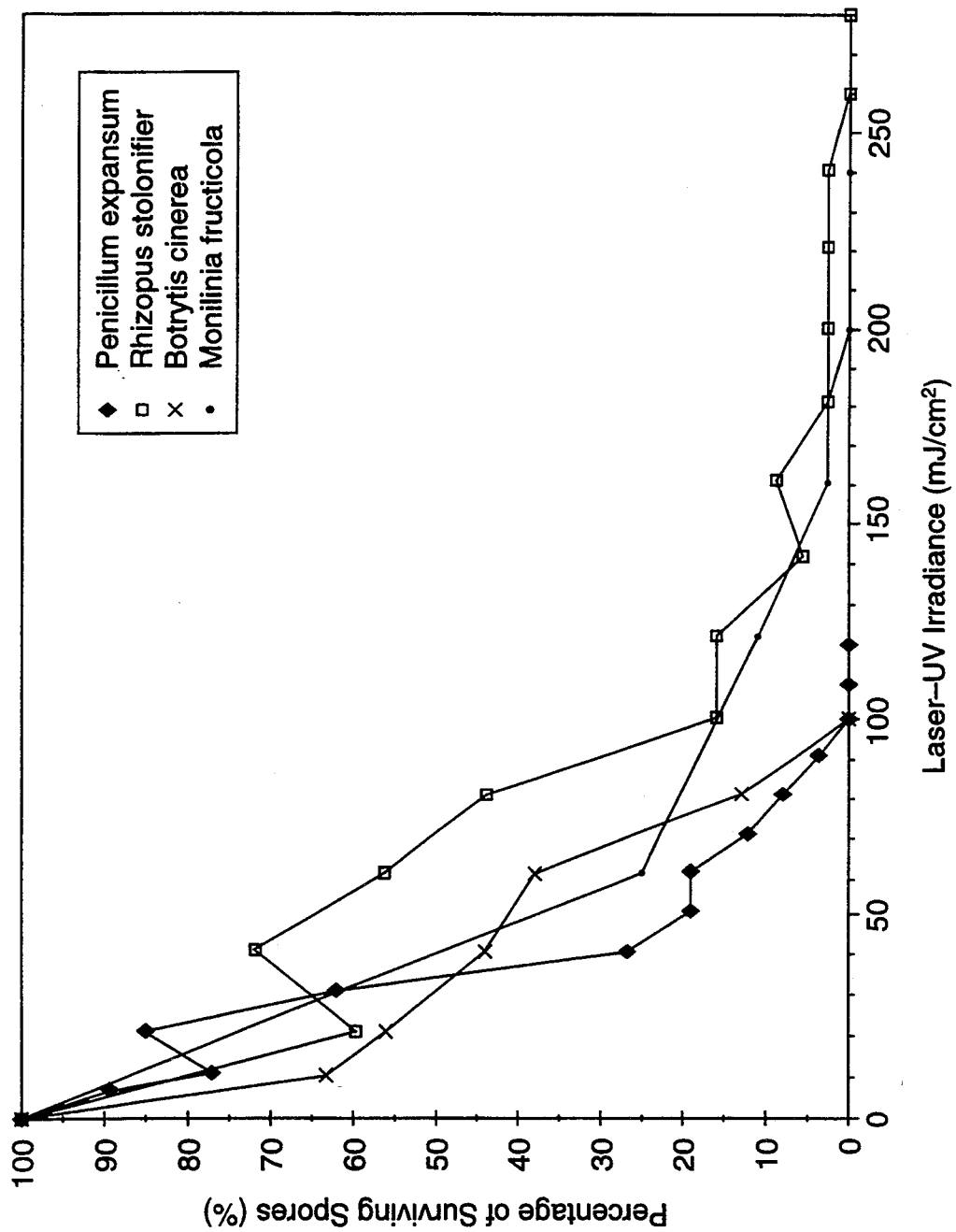
FIG. 2 is a graph showing the percentages of surviving molecules of *Geothricum candidum*, *Phytophthora citrophthora*, *Mucor piriformis* and *Fusarium roseum* as functions of energy irradiance from pulsed UV (248-nm) laser.

For the measurement of photochemical yields, pulsed UV photons from a laser (wavelength 248 nm, 20–30 nsec pulses) were used on aqueous solutions at normal pH or solutions which were acidified in order to increase solubility. FIG. 1 shows (a) absorbance, (b) molarity, (c) number of molecules left, and (d) number of destroyed molecules, as an example, in the case of experiment with $2.5 \times 10^{-4}$M aqueous solution of AMP. Similar graphs (not shown herein) were obtained from experiments with $1.0 \times 10^{-4}$M and $1.0 \times 10^{-5}$M solutions, as well as such aqueous solutions of other chemicals listed in Table 1. The results of these experiments are summarized in Table 2, showing for each solution of each chemical the molecular decomposition in terms of energy irradiance and photon (248-nm wavelength) per unit area required for destroying one molecule. Table 3 shows the relative strength of the chemicals in Table 2 by using AMP as the standard (index =100).

Tables 2 and 3 indicate that the energy transfer by photon absorption occurs primarily on the purine and pyrimidine bases, that the ribose-phosphate backbone of DNA/RNA are mostly transparent to 248-nm UV photons, that adenine and guanine (purine bases) and their derivatives are more resistant to the action of these photons than cytosine, thymine and uracil (pyrimidine bases) and that the nucleosides and nucleotides show radiation sensitivities similar to the case of free basis.

Table 4 summarizes the maximum molar absorptivity values of these compounds studied in the UV region of interest between 240–280 nm as well as their molar absorptivity values for 248-nm laser photons.

(II) Microbiological Effects

The effects of pulsed UV laser on the inactivation of various microorganisms representing different areas of health concerns were measured in a series of in vitro experiments. The species of microorganisms which have been studied for the present invention include hygiene-related bacteria such as *Enterococcus faecalis* (strain #ATCC 33186: formerly *Streptococcus faecalis*) and *Escherichia coli*; bacteria related to food spoilage such as *Erwinia carotovora*, *Pseudonomas aeruginosa* and *Pseudomonas fluorescens*; bacteria related to human pathogenesis such as *Clostridium botulinum* (type A), *Staphylococcus aureus* (coagulase-positive), *Salmonella typhimurium* and *Shigella flexneri*; and fungi commonly found in fresh fruits and vegetables such as *Aspergillus niger*, *Botrytis cinerea*, *Fusarium roseum*, *Geotrichum candidum*, *Monilinia fructicola*, *Mucor piriformes*, *Penicillium expansum*, *Phythophthora citrophthora*, *Rhizopus stolonifer* and *Thrichothecium roseum*.

As a part of microbiological studies, cultured microorganisms in glass holders were exposed to one or several pulses of 248-nm laser photons and observed under a microscope. A clear difference was observed in the growth of *Botrytis cinerea* between an area exposed with one pulse of 150 mJ and control (unexposed) areas where a dense growth was observed. A similar effect was also noted where spores of *Aspergillus niger* (highly pigmented and radiation-resistant fungi) were exposed to approximately 3 pulses with 200 mJ/pulse in 1 second (3 Hz). As observed microscopically, the germination of spores has been completely inhibited. In the field of view, only a few spores showed some germinative tubes in an effect that was delayed and later completely inhibited. This observation was made approximately one day after the laser exposure. This type of observation was conducted with samples of all the microorganisms listed above and over periods of several day after laser treatment to test the ability of pulsed UV laser photons to inhibit microbial growth.

For the test, colonies of the microorganisms of interest were grown on tryptic soy agar (TSA). Individual colonies were cut and aseptically transferred to sterile empty Petri dishes, which were divided into 2-4 areas, each receiving a single bacterial target of a known surface area. Targets were then exposed to several different levels of 248-nm UV photons with pulses ranging from 20 to 300 mJ/pulse. All the targets in each Petri dish were exposed to the same number of pulses (energy). Several samples (2-3) under each condition were exposed in order to reproduce the experiments. In addition, several control (non-exposed) samples were run in parallel.

In these experiments, great care was taken to match the target geometry with the UV photon field of exposure. A telescopic arrangement provided areas of exposures of up to 50 $cm^2$. In some experiments with *Escherichia coli* on TSA, however, the unadulterated beam profile obtained directly from the laser's exit port (of area about 3 $cm^2$) was used. Effects of different pulsed UV (248 nm) exposures were studied with 0 (control), 50, 100, 140, 180, 225, 250 and 270 $mJ/cm^2$. Even the lowest exposure (50 $mJ/cm^2$) was seen to have an effect on the cultured microbial populations. While the control sample showed more than 25 rapidly proliferating colonies, the 50 $mJ/cm^2$ plate allowed only a few to reproduce and grow. At the 100 and 140 $mJ/cm^2$ levels, only a few colonies grew larger because of the lesser competition (due to higher nutrient availability) from the inhibited colonies. With exposure ranging from 180 to 225 $mJ/cm^2$, only one colony remained viable. At 250 $mJ/cm^2$, only slight evidence of microbial activity could be seen At 275 $mJ/cm^2$ there was no evidence of any microbial growth. Because of the nature of the photon beam and its ability to scatter and be reflected from various surfaces, the exposure profile (area) increased with the total number of pulses (1 to 100). The area of growth inhibition increased with the total photon fluence (exposure). This property is advantageous in commercial applications of lasers for microbial control because the scattering effects can increase both the photon use efficiency and the effective area of treatment.

In a typical example of experiment of this type with *Thrichothecium roseum* on potato-dextrose-agar (PDA), no colonies were observed when the plates were exposed to radiant energy of 275 mJ. Once exposed, targets were transferred to tryptic soy broth (TSB) and incubated at 37° C. for 48 hours to allow growth. After incubation, the serial dilution method was used to enumerate bacterial populations.

Similar methodology was used for the ten mold genera of fungi listed above. All molds, except P. citrophthora, were grown and allowed to sporulate at room temperature for 5 to 7 days. Thereafter, spores were harvested in sterile distilled water (10-15 ml) and kept under refrigeration (3°-5° C.). P. citrophthora was grown on V-8 agar and then transferred to a Petri dish with sterile distilled water (10 ml) to allow sporation for 3–5 days, Spores were released free in the distilled water after spore suspensions were placed under refrigeration (3°–5° C.) for 30 minutes.

The experimentally observed effect of energy irradiance on the percentage of surviving microorganisms is typically as shown in FIG. 2 for the case of *Geothricum candidum, Phytophthora citrophthora, Mucor piriformis* and *Fusarium roseum*. From graphs like this, the amount of energy required to achieve a complete control (or growth inhibition) was obtained for each kind of microorganisms studied. This result is summarized in Table 5.

The study showed that non-sporulated bacterial cells were sensitive to low laser energy densities (3–15 $mJ/cm^2$) with the exception of *E. carotovora* which showed resistance to higher laser energy irradiance (25–30 $mJ/cm^2$). A preliminary test showed this resistance in the range of 1–15 $mJ/cm^2$. In vitro experiments also showed that bacterial spores (*C. botulinum* type A) required more photon energy of about 70–80 $mJ/cm^2$ than bacterial vegetative cells for inhibiting cell reproduction. Mold genera showed various levels of resistance to laser UV energy. Growth of *G. candidum, P. citrophthora* and *M. piriformis* was inhibited with low energy irradiance of about 5–20 $mJ/cm^2$. Slightly higher energy of about 30–50 $mJ/cm^2$ was required for *B. Cinerea, F. roseum* and *P. expansum* to stop their growth cycle. Medium laser energy irradiance levels of about 90–275 $mJ/cm^2$ were needed to prevent reproduction of *M. fructicola, R. stolonifer* and *T. roseum. A. niger* spores were the most resistant to laser UV energy. Their germination could not be stopped with irradiance below 1900 $mJ/cm^2$.

The studies showed that *Aspergillus niger* is the most resistant microorganisms among the bacterial and fungi included in the measurements. *Aspergillus niger* required approximately 4,000 $mJ/cm^2$ for complete inhibition, but a noticeable reduction of cell division was obtained with irradiance of approximately 700 $mJ/cm^2$. The experiments also showed that the population of *Aspergillus niger* can be reduced to less than 5% within a 300-500 $mJ/cm^2$ range.

(III) Sensory Effects

An important aspect of the investigation for the purpose of the present invention is the tolerance of the treated foods to the action of UVphoton energy. Because the pulsed UV laser treatment is to be limited to the surface of foods, any change affecting color or other surface property needs to be prevented or minimized. In order to determine some of the potential surface effects, a selected group of fresh fruits and vegetables was exposed to a range of pulsed UV laser energy irradiance ($mJ/cm^2$). After exposure, the samples were stored at room temperature or under refrigeration, and were inspected periodically for a period of up to several weeks. Tested samples included tomatoes, celery, white and red potatoes, pears, red and Granny Smith apples, nectarines, strawberries and table grapes (black and Thompson seedless).

Initially, a range of laser energy irradiance was chosen and used to determine the minimum energy irradiance that would be needed to induce a visible and unacceptable change on the food's skin surface. While most foods were found to tolerate high exposures without visible changes, a few were found to have some effects. For example, white potatoes exposed to nearly 1,000 $mJ/cm^2$ showed some minor changes similar to browning effects. This effect appeared to be due to the small amount of heat caused by absorption of the UV energy in the underlying layers of the skin. In addition, it appeared that bruised areas of the skin were also made more susceptible to this type of damage. In spite of this effect, however, the tolerable energy irradiance in potatoes appeared to be more than sufficient to control microbial loads. With pears (Summer Bartlett), a noticeable effect was observed at 2.2 $J/cm^2$ although no damage was induced with less than 2 $J/cm^2$. Among the foods that were studied, the most sensitive was celery. Visible browning changes were observed at less than 300 mJ/cm$^2$. This was probably due to the oxidation induced in the water present in the outer layers of the surface. In spite of this high sensitivity of celery, up to 200 mJ/cm$^2$ exposures could be delivered without noticeable effects. This exposure was more than adequate to control growth of most molds and bacteria normally found in celery.

Several tests were also conducted to evaluate the tolerance of various foods to exposure levels sufficient to achieve adequate microbial control. The UV energy irradiance to attain control of microbial growth in most bacteria and molds which were studied (with the sole exception of *Aspergillus niger*) was less than 300 mJ/cm$^2$. Testing was conducted as above, and no deleterious effects were noticed with red and green apples, nectarines or tomatoes exposed at up to 300 mJ/cm$^2$. Red apples were extremely resistant to surface changes. No visible changes were detected at 30 J/cm$^2$. Observation was continued under refrigeration for seven weeks after treatment without noticeable changes. No visible surface changes were observed on Granny Smith apple exposed at a lower level of 300 mJ/cm$^2$ during an extended period of observation of 4 months. Nectarines exposed at less than 300 mJ/cm$^2$ showed no observable effects over a three-week period, during the first week of which the nectarines were left at room temperature, refrigerated for the following two weeks).

Neither were there any observable effects on tomatoes exposed to 570 mJ/cm$^2$.

In what follows, the experimental observations and conclusions therefrom, which form the basis for the claimed methods of the present invention, will be summarized.

Most broadly stated, application of pulsed UV laser photons in food preservation is based on the well-documented effect of UV radiation on cell division. UV photons in the 200 to 300 nm (6 to 4 eV per photon) are strongly absorbed by nucleic acids and certain proteins, inducing chemical changes via photoactivation processes. These changes include chromosome breakage, genetic mutations and enzyme inactivation which can result in delay in growth (inhibition of cell division) or cellular death. It is understood that the cellular damage affecting cell division is due primarily to the formation of nucleotide dimers. These dimers are abundantly produced by photoactivation and are very stable, with a major inhibitory effect on DNA synthesis and a lesser effect on RNA and protein synthesis.

The present inventors have demonstrated with pulsed UV laser (248 nm) photons that microbial growth can be inhibited in a variety of microorganisms, that microbial DNA can be affected in less than 1 second of exposures (that is, 300 mJ/cm$^2$ and 1–5 pulses sec), and that microorganisms such as bacteria, yeasts and potentially viruses can be controlled on the surface of many foods without causing detrimental effects. This means that commercially available lasers operating at 500 pulses/sec have a very high potential for large-scale processing operations because the pulsed UV laser treatment would require only a few (1–5) pulses. Although the methods according to the present invention are somewhat similar to prior art methods using low-intensity continuous-wave, the present inventors have thus shown that a pulsed UV laser can deliver sufficient energy to achieve the disruption of microbial DNA and prevent its repair in an extremely short period of time.

When radiant energy is absorbed by DNA and RNA molecules, a fraction of the chemical damage can be reverted by a protection mechanism acting at the chemical and enzymatic levels. The chemical mechanism is due to radical-molecule reactions, leading to the re-formation (or repair) of the original molecules and is highly dependent on thermodynamic and kinetic factors regulating all chemical reactions. Temperature and concentration are essential variables in this mechanism, as is the presence of radical scavengers, stabilizers and/or protective agents which tend to reduce the action of the short-lived radicals. The enzyme-based repair mechanism of UV-induced dimer formation is attributed to a photoreactivation effect at longer wavelengths such as visible photons in the range of 400–700 nm in wavelength. In this range, certain enzymes such as photoreactivating enzymes are energized to incise, remove and re-synthesize or restore the continuity of the DNA and RNA strand. Because no re-growth (or re-population) of microbial populations was observed in our microbiology experiments, it may be concluded that pulsed UV lasers cause irreparable defects and irreversible damage to microbial DNA and that microbial growth inhibition induced by pulsed UV laser is not repaired by any known chemical and/or enzymic mechanisms.

It is known that the absorption of radiant energy depends on molecular structure and the physical properties of the radiation such as wavelength. Thus, matching the source with the target allows specific types of molecules to be electronically excited and irreversible chemical effects can be obtained, including reactions that affect biological functions such as cell division. Lasers in the pulsed mode are capable of delivering high power. With continuous-wave absorption, the available power is now limited to a few kW/cm$^2$ or less, because higher power levels would atomize the exposed molecules. Thus, with short (nsec or $\mu$sec) pulsed lasers with typical outputs of nearly 1 J/cm$^2$/pulse, the average power levels can be as high as a few MW/cm$^2$. Typical beam sizes for lasers are 4–8 cm$^2$ but beam expansion and propagation allow larger areas such as several hundreds to thousands cm$^2$ to be treated with the same power densities by beam sweeping or with reduced power by beam defocusing. Thus, with the availability of commercial UV lasers operating with up to 500 pulses per second, large-scale processing of a variety of surfaces for microbial growth inhibition and/or for other photon-induced effects is possible, and several food processing opportunities do exist to process foods without chemical preservatives. In addition to the average power capabilities of pulsed UV lasers, the ultrashort pulsed nature of the energy delivered to a substrate has a unique effect on the kinetics of photon-induced reactions. In contrast to the continuous-wave energy input of conventional UV light sources, in which a second-order kinetics is predominant between the radicals formed and the molecules of the substrate (that is, radical-molecule reactions), the high instantaneous concentration of radicals produced by ultra-short pulses lead to a stoichiometrically favored radical-radical reactions. It appears that the dominance of radical-radical reactions with pulsed lasers also affects and impede some of the known enzyme-controlled repair mechanisms such as photoreactivation, excision repair and post-replication, usually encountered under continuous-wave UV exposure conditions. The high energy fluence (that is, the number of photons per unit area per unit time) being absorbed by the resonant chemical structures such as DNA induces a higher lethality in cells due to direct effect on the chemical structures of DNA and/or RNA, as well as the disruptive effect on the photoreactivating enzymes. In this manner, the net effect of pulsed UV lasers, in comparison to continuous-wave UV sources, is to overwhelm or counteract the effectiveness of the repair mechanism. In other words, the present inventors have demonstrated that the UV photon energy absorbed and leading to cell inhibition and lethality is more efficient if use is made of ultra-short ($10^{-12}$–$10^{-6}$ seconds) pulsed UV radiation from a laser source.

The energy of UV light is considerably less than that of ionizing radiation and, thus, UV photons have less penetration. The efficacy of the UV light is, therefore, limited to the surface of the contaminated products to be treated. In the case of solid or dried foods, the action and effect of UV light are limited within a depth of less than 1 mm. In more complex food mixtures in liquid form, the penetration reaches a few centimeters. The methods according to the present invention, while limited to shallow food surfaces, are advantageous not only because they can substitute the use of contact chemicals but also because the bulk of the food would not be affected. The latter aspect is helpful in terms of consumer acceptance.

The present invention has been described above in connection only with its aspect of food preservation, but it can have many different applications such as controlled fermentation, detoxification of toxins, destruction of surface organic residues such as pesticides, fungicides and herbicides, removal of organic and inorganic residues by laser ablation, treatment of water for microbial disinfestation, disinfestation of spices, seeds and packaging materials, insect control based on radiation effects on eggs, pupae, larval and adult stages, treatment of surface tumor lesions and cellular manipulations including the probing of specific sub-cellular structures.

It is also be to noted that the present invention is based on experiments carried out by using a currently available laser source. The scope of the invention is by no means intended to be unduly limited by the particular characteristics of the laser radiation source.

In summary, the disclosure made herein is intended to be interpreted broadly, and the examples as being illustrative and not as being limitative.

TABLE 1

| Bases | Nucleosides | Nucleotides |
|---|---|---|
| Purine Base Derivatives: | | |
| Adenine (A) | Adenosine (AS) | Adenosine 5'-monophosphate (AMP) |
| | 2'-deoxyadenosine (d-AS) | 2'-deoxyadenosine 5'-monophosphate (d-AMP) |
| Guanine (G) | Guanosine (GS) | Guanosine 5'-monophosphate (GMP) |
| | 2'-deoxyguanosine (d-GS) | 2'-deoxyguanosine 5'-monophosphate (d-GMP) |
| Pyrimidine Base Derivatives: | | |
| Cytosine (C) | Cytidine (CS) | Cytidine 5'-monophosphate (CMP) |
| | 2'-deoxycytidine (d-CS) | 2'-deoxycytidine 5'-monophosphate (d-CMP) |
| Thymine (T) | Thymidine (TS) | 2'-deoxythymidine 5'-monophosphate (d-TMP) |
| Uracil (U) | Uridine (US) | Uridine 5'-monophosphate (UMP) |

TABLE 2

| Chemical | Solution (molecules) | Energy Irradiance (J/cm$^2$ · molecule) | Photon Irradiance (Photons/cm$^2$ · molecule) |
|---|---|---|---|
| AMP | $4.5 \times 10^{17}$ | $460 \times 10^{-17}$ | $5,800 \times 10^{-4}$ |
| | 1.8 | 130 | 1,700 |
| | 0.18 | 210 | 2,700 |
| d-AMP | 2.3 | 430 | 5,300 |
| | 1.8 | 300 | 3,700 |
| | 0.18 | 170 | 2,100 |
| CMP | 4.5 | 25 | 320 |
| | 1.6 | 42 | 520 |
| | 0.16 | 76 | 950 |
| d-CMP | 4.5 | 17 | 210 |
| | 0.9 | 45 | 570 |
| | 0.09 | 180 | 2,300 |
| GMP | 4.5 | 140 | 1,700 |
| | 1.8 | 170 | 2,100 |
| | 0.18 | 85 | 1,100 |
| D-GMP | 4.5 | 75 | 940 |
| | 1.8 | 95 | 1,200 |
| | 0.18 | 24 | 3,000 |
| d-TMP | 4.5 | 7 | 82 |
| | 1.8 | 8 | 110 |
| | 0.18 | 39 | 490 |
| UMP | 4.5 | 3 | 32 |
| | 1.8 | 4 | 55 |
| | 0.18 | 16 | 200 |

TABLE 3

| Nucleotide | Radiation Sensitivity (photons/cm$^2$ · molecule) | Relative Stability (%) |
|---|---|---|
| AMP | 5,800 | 100 |
| d-AMP | 5,300 | 91 |
| CMP | 320 | 6 |
| d-CMP | 210 | 4 |
| GMP | 1,700 | 29 |
| d-GMP | 940 | 16 |
| d-TMP | 82 | 1 |
| UMP | 32 | 1 |

TABLE 4

| Compounds | UV Molar Absorptivity | |
|---|---|---|
| | Maxima (λ) | 248 nm |
| (A) | 14,100 (261 nm) | 9,760 (69%) |
| (AS) | 14,200 (259 nm) | 10,000 (71%) |
| (AMP) | 16,000 (259 nm) | 12,960 (81%) |
| (d-AS) | 15,100 (258 nm) | 12,080 (80%) |
| (d-AMP) | 15,600 (258 nm) | 10,608 (68%) |
| (C) | 5,611 (267 nm) | 4,880 (87%) |
| (CS) | 8,634 (272 nm) | 6,990 (81%) |
| (CMP) | 6,680 (273 nm) | 5,138 (77%) |
| (d-CS) | 12,100 (281 nm) | 3,157 (26%) |
| (d-CMP) | 13,150 (275 nm) | 5,786 (44%) |
| (G) | 13,400 (250 nm) | 13,176 (98%) |
| (GS) | 13,000 (253 nm) | 12,435 (96%) |
| (GMP) | 13,120 (253 nm) | 12,595 (96%) |
| (d-GMP) | 12,500 (253 nm) | 12,000 (96%) |
| (T) | 7,860 (263 nm) | 4,944 (63%) |
| (TS) | 9,780 (265 nm) | 5,313 (54%) |
| (d-TMP) | 6,970 (265 nm) | 3,555 (51%) |
| (U) | 5,675 (282 nm) | 2,500 (44%) |
| (US) | 9,580 (262 nm) | 6,141 (64%) |
| (UMP) | 9,690 (262 nm) | 6,300 (65%) |

TABLE 5

| Microorganisms | Energy Irradiance (mJ/cm$^2$) | Photon Irradiance (Number of photons/cm$^2$ |
|---|---|---|
| (A) Bacteria | | |
| Clostridium botulinum (type A) | 70-80 | $8.8$–$10.0 \times 10^{15}$ |
| Enterococcus faecalis | 5-10 | 0.6-1.2 |

TABLE 5-continued

| Microorganisms | Energy Irradiance (mJ/cm$^2$) | Photon Irradiance (Number of photons/cm$^2$) |
|---|---|---|
| *Erwinia carotovora* | 25–30 | 3.1–3.8 |
| *Escherichia coli* | 5–10 | 0.6–1.2 |
| *Pseudomonas aeruginosa* | 1–3 | 0.13–0.38 |
| *Pseudomonas fluorescens* | 10–15 | 1.2–1.9 |
| *Salmonella typhimurium* | 1–3 | 0.13–0.38 |
| *Shigella flexneri* | 1–3 | 0.13–0.38 |
| *Staphylococcus aureus* | 1–3 | 0.13–0.38 |
| (B) Molds | | |
| *Aspergillus niger* | 1,800–1,900 | 225–238 × 10$^{15}$ |
| *Botrytis cinerea* | 40–50 | 5.0–6.3 |
| *Fusarium roseum* | 30–35 | 3.8–4.4 |
| *Geotrichum candidum* | 5–10 | 0.6–1.2 |
| *Monilinia fructicola* | 90–100 | 11.3–12.5 |
| *Mucor piriformis* | 10–20 | 1.2–2.5 |
| *Penicillum expansum* | 45–50 | 5.6–6.3 |
| *Phytophthora citrophthora* | 5–10 | 0.6–1.2 |
| *Rhizopus stolonifer* | 120 130 | 15.0–16.3 |
| *Thrichothecium roseum* | 250–275 | 31.3–34.4 |

What is claimed is:

1. A method of controlling undesired microorganisms on the surface of food, comprising the step of irradiating the surface of a food object containing undesired microorganisms with a plurality of monochromatic, ultraviolet light pulses wherein said microorganisms are reduced or eliminated by destructively altering nucleic acid based structures in said microorganisms with said irradiation without alteration of surface properties of said food object.

2. A method as recited in claim 1, wherein said light pulses have a duration ranging from approximately 20 to 30 ns.

3. A method as recited in claim 1, wherein said microorganisms are irradiated with fewer than approximately 100 of said light pulses.

4. A method as recited in claim 1, wherein said object is irradiated for less than approximately one second, said light pulses have a duration ranging from approximately 1 ns to 100 ns, and said light pulses have energy densities ranging from approximately 1 to 2 J/cm$^2$.

5. A method as recited in claim 4, wherein said light pulses have a wavelength between approximately 240 nm and 280 nm.

6. A method of controlling microorganisms on the surface of a food object, comprising the step of destructively altering nucleic acid based structures in said microorganisms by irradiating said microorganisms on the surface of a food object with a plurality of monochromatic, ultraviolet light pulses for less than approximately one second, said light pulses having a duration ranging from approximately 1 ns to 100 ns, and said light pulses having energy densities ranging from approximately 1 to 2 J/cm$^2$, wherein said microorganisms are reduced or eliminated by said irradiation without affecting surface characteristics of said food object.

7. A method as recited in claim 6, wherein said light pulses have a wavelength between approximately 240 nm and 280 nm.

8. A method as recited in claim 6, wherein said pulses have a duration ranging from approximately 20 to 30 ns.

9. A method as recited in claim 6, wherein fresh foods are irradiated with said light pulses, said light pulses having energy densities ranging from approximately 1 to 100 mJ/cm$^2$.

10. A method as recited in claim 6, wherein said microorganisms are irradiated with fewer than approximately 100 said light pulses.

11. A method as recited in claim 6, wherein potatoes are irradiated with said light pulses, said light pulses having energy densities of approximately 1000 mJ/cm$^2$ or less.

12. A method as recited in claim 6, wherein pears are irradiated with said light pulses, said light pulses having energy densities of approximately 2.2 J/Cm$^2$ or less.

13. A method as recited in claim 6, wherein celery are irradiated with said light pulses, said light pulses having energy densities of approximately 300 mJ/cm$^2$ or less.

14. A method as recited in claim 6, wherein apples are irradiated with said light pulses, said light pulses having energy densities of approximately 300 mJ/cm$^2$ or less.

15. A method as recited in claim 6, wherein nectarines are irradiated with said light pulses, said light pulses having energy densities of approximately 300 mJ/cm$^2$ or less.

16. A method as recited in claim 6, wherein tomatoes are irradiated with said light pulses, said light pulses having energy densities of approximately 300 mJ/cm$^2$ or less.

17. A method of controlling microbial contamination without altering the visual appearance of food surfaces, comprising the step of destructively altering nucleic acid based structures in contaminating microbes on a food surface by irradiating said food surface with a plurality of monochromatic, ultraviolet light pulses, wherein said microbes are reduced or eliminated by said irradiation without altering surface properties.

18. A method as recited in claim 17, wherein said food surface is irradiated for less than approximately one second, said light pulses having a duration ranging from approximately 1 ns to 100 ns, and said light pulses having energy densities ranging from approximately 1 to 2 J/cm$^2$.

19. A method as recited in claim 17, wherein said light pulses have a duration ranging from approximately 20 to 30 ns.

20. A method as recited in claim 19, wherein said food surface is irradiated with fewer than approximately 100 of said light pulses.

* * * * *